United States Patent [19]

Inaba et al.

[11] Patent Number: 4,787,674
[45] Date of Patent: Nov. 29, 1988

[54] SEAT ADJUSTING APPARATUS

[75] Inventors: Yasuhisa Inaba, Handa; Kenichi Kazaoka, Nagoya; Hiroshi Okazaki, Toyota, all of Japan

[73] Assignee: Aisin Seiki Kabushiki Kaisha, Kariya, Japan

[21] Appl. No.: 80,195

[22] Filed: Jul. 31, 1987

Related U.S. Application Data

[63] Continuation of Ser. No. 716,770, Mar. 27, 1985.

[30] Foreign Application Priority Data

Mar. 29, 1984 [JP] Japan ................................. 59-62040

[51] Int. Cl.$^4$ ............................................. A47C 1/02
[52] U.S. Cl. ............................................. 297/317
[58] Field of Search .............. 297/317, 321, 346, 337, 297/383, 340; 248/429, 421, 430, 395, 393

[56] References Cited

U.S. PATENT DOCUMENTS

| | | | |
|---|---|---|---|
| 2,611,420 | 9/1952 | Diehl | 297/346 |
| 2,678,681 | 5/1954 | Haltenberger | 297/383 |
| 3,090,647 | 5/1963 | Moore | 297/337 X |
| 3,286,971 | 11/1966 | Walter et al. | 297/337 X |
| 3,720,442 | 3/1973 | Bergmann et al. | 297/383 X |
| 4,043,529 | 8/1977 | Pickles | 297/346 |
| 4,168,051 | 9/1979 | Terada | |
| 4,355,778 | 10/1982 | Hess et al. | 248/429 |
| 4,470,632 | 9/1984 | Babbs | 297/346 X |
| 4,497,518 | 2/1985 | Nishimura et al. | 248/393 X |

FOREIGN PATENT DOCUMENTS

| | | | |
|---|---|---|---|
| 714601 | 11/1931 | France | 297/317 |
| 273039 | 1/1951 | Switzerland | 297/317 |

Primary Examiner—Peter A. Aschenbrenner
Attorney, Agent, or Firm—Finnegan, Henderson, Farabow, Garrett & Dunner

[57] ABSTRACT

A seat adjusting apparatus having a main frame assembly and a seat assembly. The main frame assembly includes a first frame and a backrest, while the seat assembly inlcudes a second frame and a seat. Devices are provided for slidably mounting the first frame, as well as movably mounting the second frame on the first frame. Further, the seating adjusting apparatus includes components, which are responsive to the sliding movement of the first frame in a first direction through a first distance for moving the second frame relative to the first frame in opposite direction through a distance less than the first distance.

10 Claims, 4 Drawing Sheets

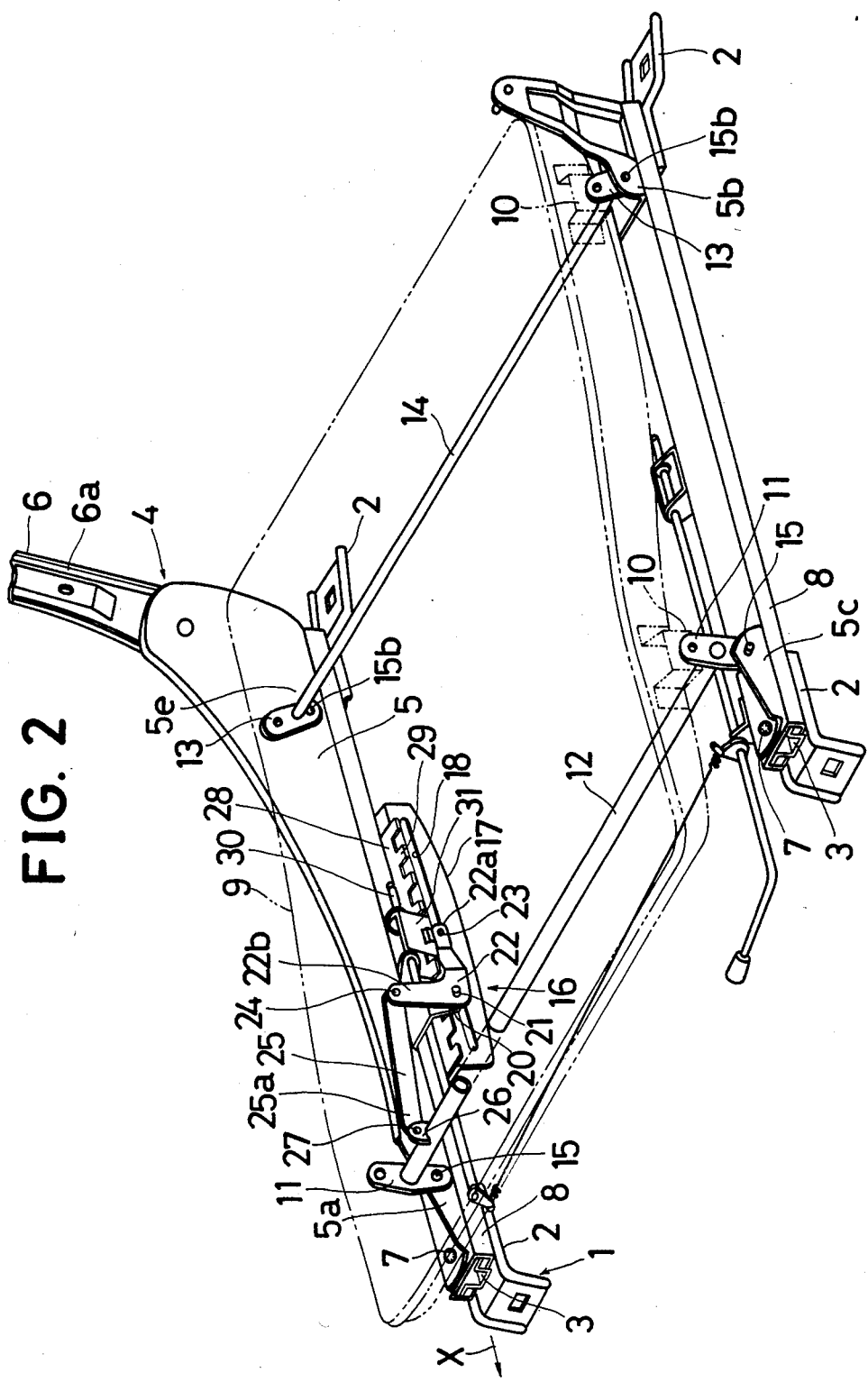

SEAT ADJUSTING APPARATUS

This application is a continuation of application Ser. No. 06/716,770, filed Mar. 27, 1985.

BACKGROUND OF THE INVENTION

The present invention relates generally to a seat assembly adjusting apparatus and more particularly to a seat assembly adjusting apparatus for vehicle seats having a seat and a backrest which are moved in opposite relative directions in different increments.

Many types and designs of vehicle seat adjusting devices exist for modifying the position of the seat with respect to the forward portion of the vehicle. Conventional devices typically involve adjusting the forward and rearward position of both the seat and the backrest, which are slidably adjusted as one unit. As a result, when the unit is adjusted forward to accommodate relatively short occupants of the vehicle the amount of available seat space is just the same as when the unit is extended rearward to provide room for taller occupants. Thus, in one instance the seat generally conflicts with the normal bend of the knee of the shorter occupants, while the seat likely fails to provide taller occupants with adequate support.

SUMMARY OF THE INVENTION

Accordingly, it is an object of the invention to provide a seat assembly adjusting apparatus in which the seat and backrest are moved in opposite relative directions and in different increments, thus offering a longer seat for taller occupants and a correspondingly shorter seat for shorter occupants.

It is another object of the invention to provide a seat assembly adjusting apparatus for a vehicle in which adjustment of the seat and the backrest is accomplished easily and simultaneously by one movement of an actuating device.

It is still another object of the present invention to provide a seat assembly adjusting apparatus requiring a minimal number of parts to operate the device.

Additional objects and advantages of the present invention will be set forth in part in the description that follows and in part will be obvious from the description or may be learned by practice of the invention. The objects and advantages of the invention may be realized and obtained by the methods and apparatus particularly pointed out in the appended claims.

To achieve the objects and in accordance with the purpose of the invention, as embodied and as broadly described herein, a seat adjusting apparatus comprises a main frame assembly and a seat assembly. The main frame assembly includes a first frame and a backrest, while the seat assembly includes a second frame and a seat. Means are provided for slidably mounting the first frame. Means are further provided for movably mounting the second frame on the first frame. Further, the present invention includes means responsive to a sliding of the first frame in a first direction through a first distance for moving the second frame relative to the first frame in an opposite direction through a distance less than the first distance.

According to the present invention, the second frame mounting means may include first link means pivotably interconnecting the first and second frame means. The moving means may include a second link means connected at a first end to the first link means, the second link means supporting a cam follower. In addition the second moving means includes a cam plate connected to the first frame and having a cam slot shaped to receive the cam follower of the second link means. The moving means actuates the first and second link means in response to the movement of the first frame to shift the second frame and seat relative to the first frame.

According to the present invention, the moving means may include a first rack and a first gear. The first gear is rotatably mounted on the first frame to engage the first rack. The moving means may also include a second gear and a second rack. The second gear is preferably smaller than the first gear while being secured to and rotatable with the first gear. The second rack is secured to the second frame and is engaged by the second gear.

The accompanying drawings, which are incorporated in and constitute part of this specification, illustrate preferred embodiments of the invention and, together with the the specification, serve to explain the principles of the invention.

BRIEF DESCRIPTION OF THE DRAWINGS

FIG. 2 is a perspective view of the entire seat assembly adjusting apparatus of FIG. 1;

DESCRIPTION OF THE PREFERRED EMBODIMENT

Reference will now be made in detail to presently preferred embodiments of the invention, examples of which are illustrated in the accompanying drawings.

Figure 1:
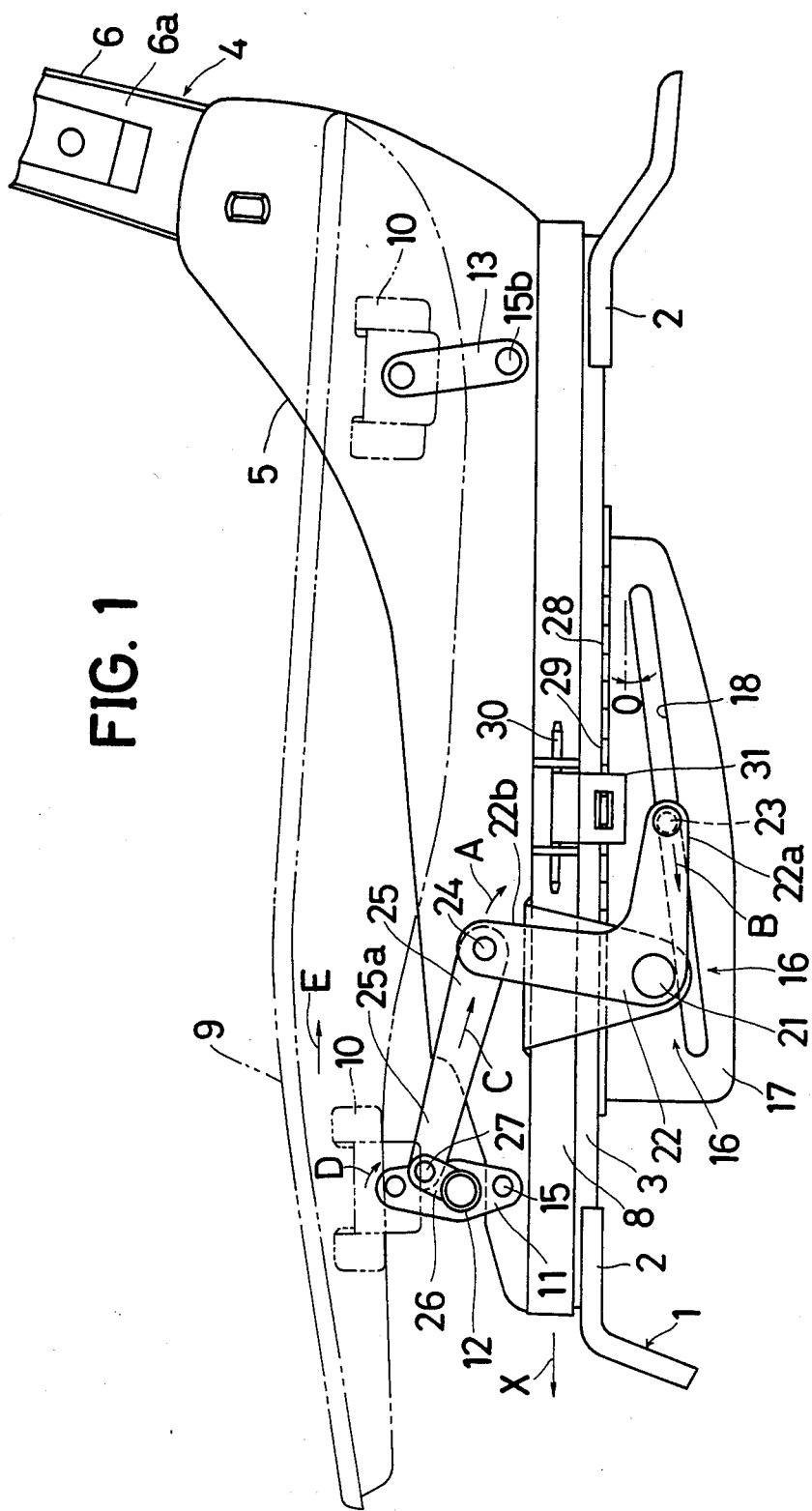
FIG. 1 is a side view of one side of an embodiment of a seat assembly adjusting apparatus constructed in accordance with the teachings of this invention.

Referring now to FIGS. 1 and 2, it may be seen that rotation of a hand lever releases a lock mechanism enabling the seat adjusting apparatus of the present invention to be operated in response to the forward and rearward movement of the seated occupant. The present invention includes a seat adjusting apparatus, generally designated by the reference numeral 10, having a first frame 12, a backrest 14, a second frame 16 and a seat 18.

In accordance with the invention, the seat adjusting apparatus also includes means for slidably mounting the first frame. As embodied herein, four mounting brackets 20a, 20b, 22a and 22b are rigidly attached to a vehicle floor. The brackets are spaced and arranged in pairs to support a pair of inner lower rails 24 and outer upper rails 26. Each inner rail 24 is individually mounted atop each pair of brackets 20a, 20b and 22a, 22b. The outer rails 26 are slidably positioned about the rigidly mounted inner rails 24, forming parallel sets of the inner and outer rails 24, 26. The first frame 12 is securely attached to outer rails 26 by fastening means such as rivets 28. The first frame 12 includes a pair frame members 12a (only one shown) and a pair of support brackets 12b and 12c. First frame member 12a is thus affixed to the upper surface of outer rail 26 which is slidably positioned about inner rail 24 mounted atop brackets 22a, 22b. First support brackets 12b and 12c are situated at opposite ends of the outer rail 26, which is slidably positioned atop brackets 20a and 20b.

In accordance with the invention, the seat assembly adjusting apparatus also includes means for movably mounting the second frame on the first frame. As embodied herein, the first frame 12 and the second frame 16 are connected by a set of preferably four links 30a, 30b, 30c and 30d. Each link is provided with a pair of apertures 34a for receiving pins 34a to pivotally attach the four links to the first and second frame members 12, 16. Preferably, attaching means such as U-shaped fittings 36 enable links 30a, 30b, 30c and 30d to be connected to a second frame member 16. Links 30a and 30b are attached to the opposite ends of a front rod 38, whereas the remaining link 30c and 30d are attached at the opposite ends of a rear rod 40.

In accordance with the invention, the seat adjusting apparatus also includes means responsive to a sliding of the first frame in a first direction through a first distance for moving the second frame relative to the first frame in an opposite direction through a distance less than the first distance. As embodied herein and shown principally in FIG. 1, the moving means include a L-shaped link 42 pivotably connected by a first section 42a to an actuating arm 44. A rock lug 46 secured to front rod 38 is pivotally connected to the actuating arm 44. The second link 42, which has a substantially L-shaped configuration include a second section with an end 42b supporting a cam follower 48. The second link 42 is rotatably supported by a pivot pin 49 seated in a bracket arm 50 which depends from the outer rail 26.

Figure 3:
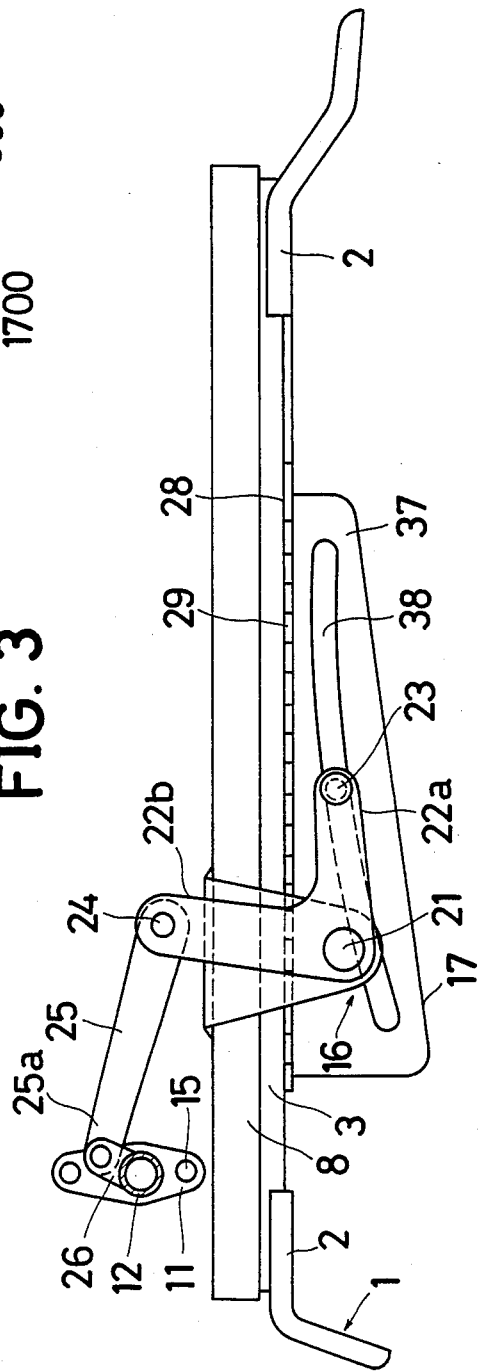
FIG. 3 is a side view of one side of another embodiment of the seat assembly adjusting apparatus of FIG. 1.

As embodied herein, a cam plate 52, which is attached to a lower surface of inner rail 24, includes a cam slot 54 for receiving cam follower 48. Cam slot 54 is preferably a substantially straight elongated groove, which declines gradually from with respect to a horizontal plane in a direction forward or away from the backrest 14 and at a predetermined angle, as identiffed in FIG. 1 as angle θ. Cam slot 54 may also be an elongated arcuate groove, which curves slightly downward when measured from rearward to forward, i.e. in a direction away from the backrest, as shown in FIG. 3.

In accordance with the present invention, the seat assembly adjusting apparatus also includes means for selectively preventing sliding movement between the inner and outer rails and hence holds the seat and backrest in adjusted positions. As embodied herein and shown in FIG. 1, this sliding prevention means include a toothed plate 56 fixed to and projecting substantially orthogonally from the base of one of the inner rails 24. A clevis 58 is mounted on the side of fixed outer rail 26 adjacent to the toothed plate 56. The clevis 58 receives a rotatable shaft 60 to which is secured a lock plate 62 having an aperture 64 to latch with a tooth on plate 56. The rotatable bar 60 is attached to a first pivot lever 66. A handle 68 is mounted on the side of the seat assembly 10 adjacent the inner rail 24 and atop the brackets 20a, 20b and is supported by a second U-shaped support plate 70 and a support bracket 72. A second pivot lever 74 adjacent support bracket 72 is connected to first pivot lever 66 by a cable 76.

The operation of a seat adjusting apparatus according to the present invention will now be described in detail with reference to FIGS. 1–3. Typically, if the seat occupant is short, the seat and backrest will have to be moved forward. Disengagement of the lock plate 62 from the toothed plate 56 enables outer rail 26 to be moved along inner rail 24 in the direction of arrow X, i.e., toward the forward direction of the vehicle. Thus, clockwise rotation of hand lever 68, as viewed in FIG. 2, results in rotation of the shaft 60, which in turn disengages lock plate 62 from toothed plate 56, so that upper rail 26 can be slidably moved. As the first frame 12 and seat 18, which is attached to upper rail 26, is moved forward under the urging of the occupant of the seat 18, cam follower 48 travels within cam slot 54 in the direction denoted by arrow B. The extent of movement of cam follower 48 is defined by the configuration of cam slot 54. If the linear angle B is large, the rotational effect of second link 42 is correspondingly large. As shown in FIG. 3, the movement of the seat 18 may be nonlinearly regulated with respect to the first frame 12 through use of the curved cam slot 54.

As the occupant urges and moves the seat and backrest 14 forward, the cam follower 48 moves forward and the first end 42b of second link 42 is rotated in the direction depicted by arrow A in FIG. 1. The second link 42 fulcrums on the pivot pin 49 to pull actuating arm 44 and rock lug 46 in the direction indicated by arrow C. The force of rock lug 46 on link 30a pivots the seat 18 downward and relatively rearward as denoted by arrows D and E, respectively, while the seat is simultaneously being moved in the direction by the urging of the occupant of the seat 18. As a result, the first frame 12 and the seat 18 are moved simultaneously, such that the distance in which the first frame 12 and the backrest 14 travel is greater than the distance of relative rearward movement of the seat 18. Thus, the seat adjusting apparatus 10 enables the occupant to slide the seat 18 and the backrest 14 forward and, at the same time, actually shorten the length and lower the height of the seat 18.

Similarly, if the passenger is tall and the seat and backrest must be moved rearward, the operation of the seat adjusting apparatus 10 is reversed. Following disengagement of the lock plate 62 from the toothed plate 56, the cam follower 48 moves in the opposite direction of arrow B, i.e. rearward. Accordingly, the first end section 42a of second link 42 is rotated into the opposite direction of arrow A and the actuating arm 44 moves in the opposite direction of arrow C, in response to the rotational force applied by the rock lug 46. Accordingly, first links 30a, 30b, 30c and 30d are pivoted opposite the direction of arrow D, to move the seat 18 slightly upward and also forward relative to the rearward movement of the backrest. Thus, the seat 18 and the backrest 14 slide rearward, though the seat 18 also moves forward relative to the backrest 18 to provide the taller occupant with a longer seat.

Also according to the present invention, means responsive to a sliding of the first frame in a first direction through a first distance for moving the second frame relative to the first frame in an opposite direction through a distance less than the first direction may include an alternate embodiment. As embodied herein and shown in FIG. 4 and 5, the moving means may include sliding support means, such as a pair of sliding plates 80, formed on the sides of the seat 18. Sliding plates 80 support a pair of rollers 82 formed on shafts 84 at the forward and rearward ends of the sliding plate 80. The first frame 12 includes a pair of roller guides 85 that receive rollers 82 of slide plate 80 for moving the second frame 16 and seat 18 relative to the first frame 12 and the backrest 14.

Figure 5:
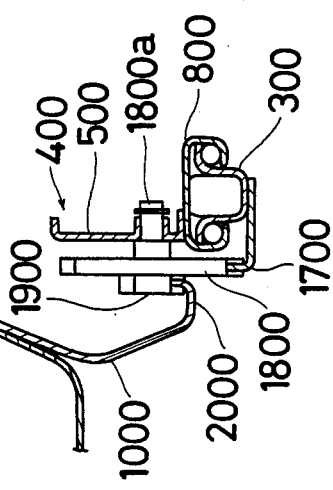
FIG. 5 is a sectional view taken along the line 4—4 of FIG. 4 looking in the direction of the arrows.

As embodied herein, the moving means also includes first and second racks 86, 88, respectively meshing with the first and second gears 90, 92. As illustrated in FIG. 5, the first gear 90 is splined to a stud shaft 91 rotatably mounted in a bearing member 93 on the first frame 12. The second gear 92 is smaller than the first gear 90, while being secured to and rotatable with the first gear 90 about the axis of the shaft 91. The second rack 88 is secured to the second frame 16 and is engaged by the second gear 92. This embodiment may also include a seat release mechanism similar to that shown in FIG. 1.

Figure 4:
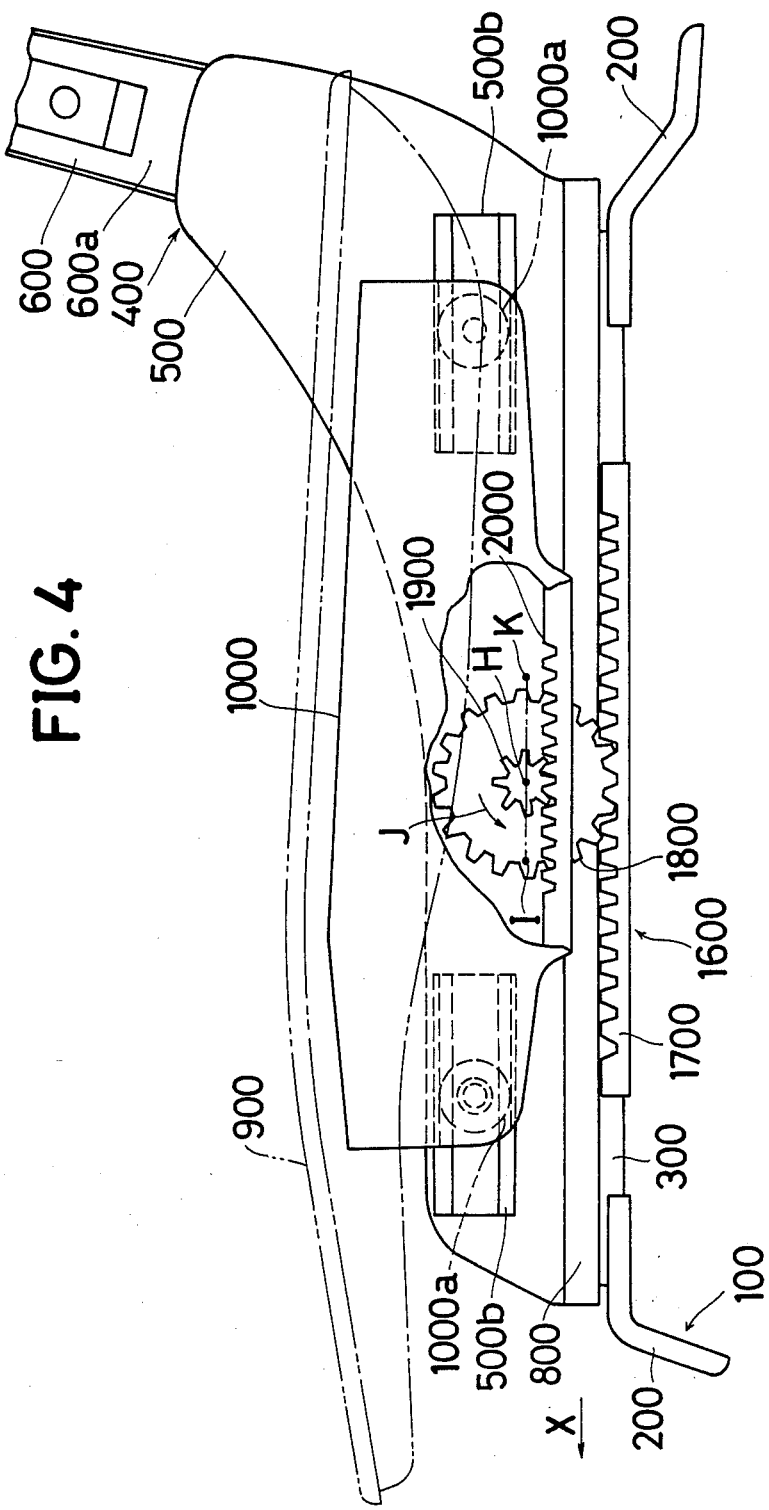
FIG. 4 is side view partially cut away of one side of still another embodiment of the seat assembly adjusting apparatus of FIG. 1.

The operation of this embodiment of the present invention will now be described in detail with reference to FIGS. 4 and 5. Assuming the occupant of the vehicle seat is short, it may be desirable to adjust the seat 18 and backrest 14 forward. After turning hand lever 68 (see FIG. 1) and disengaging the lock plate 62 from the toothed plate 56 the seat assembly 10 slides forward by the urging motion of the occupant of the seat 18. As the frame 12 is urged forward, the first gear 90 moves along the first stationary rack member 86. In moving along the first rack member 86 between the H and I positions as shown in FIG. 4, the second gear is simultaneously rotated to the I position. Rotation of the second gear in the direction noted by arrow J, causes the second rack member 88 and the second frame 16 to be moved rearward relative to first such member 86 second. Accordingly, the rollers 82 second frame 16, seat 18, first frame 12 and backrest 14 all move forward; however, the backrest 14 moves a greater distance than the seat 18 due to the relative rearward movement of the seat, so that the effective seat area is shortened as well as being moved forward.

In more detail, disengagement of the lock plate 62 from the toothed plate 56 allows the seat 18 and the backrest 14 to be urged forward by movement the occupant of the seat 18. As the backrest 18 moves forward, the first gear 90 rotatably engages the stationary first rack 86. Since the second gear 92 rotates with the first gear 90, engagement between the second gear 92 and the second rack 88 causes the sliding plate 80 to slide rearward relative to the first frame 12. The relative rearward movement of the sliding plate 80 is facilitated by the rotation the rollers 82 within the roller guides 85. Further, the difference in size between the first gear 90 and the second gear 92 results in the backrest 14 being moved forward a greater distance than the relative rearward movement of the seat 18.

Similarly, if the seated occupant is tall, it may be desirable to slide the seat assembly 10 rearward. Essentially, the steps noted above are reversed. Accordingly, rotation of the handle 68 releases the engagement between the lock plate 62 and the toothed plate 56. As the first frame 12 and the backrest 14 are urged rearward, the first gear rotates about the first rack 86 from the H position to the K position as shown in FIG. 4. As a result, the second gear is moved from the H position to the K position, sliding the second rack 86 forward relative to the first rack 86.

Considering the operation of the gear mechanism, as the first gear 90 rotates rearward about the stationary first rack 86, the backrest 14 slides rearward. On the other hand, the engagement of the second gear 92, which is rotated with the larger first gear 90, and the second rack, causes the rollers 82 of the sliding plate 80 to roll forward within the roller guides 84. The difference in size between the first gear 90 and the second gear 92 results in the backrest 14 being moved rearward at a greater distance thant the seat 18. The relative forward movement between the seat 18 and the backrest 14 lengthens the effective seat for the taller occupant.

It will be apparent to those skilled in the art that modifications and variations can be made in the seat assembly adjusting apparatus of this invention. The invention in its broader aspects is, therefore, not limited to the specific details, representative methods and apparatus, and illustrative examples shown and described. Thus, it is intended that all matter contained in the foregoing description or shown in the accompanying drawings shall be interpreted as illustrative and not in a limited sense.

What is claimed is:

1. A seat assembly adjusting apparatus, which comprises:

a main frame assembly including a first frame supporting a backrest and a second frame supporting a seat;

means for slidably mounting said first frame on a vehicle floor so that the backrest can slide in a forward direction and a backward direction;

attaching means for attaching said second frame to said first frame and for urging the seat in a forward direction and a backward direction with respect to the first frame; and connecting means between the mounting means and the attaching means for moving the attaching means in response to the sliding of the first frame and backrest, such that the attaching means urges the seat in the forward direction through a first distance when the backrest slides in the backward direction through a second distance greater than the first, and such that the seat is urged in the backward direction through the first distance when the backrest slides in the forward direction through the second distance;

said attaching means including first link means pivotally interconnecting said first and second frame; and said connecting means including a second link means connected at a first end to said first link means and supporting a cam follower at a second end, and a cam plate connected to said mounting means, with said cam plate having a cam slot shaped to receive said cam follower such that said first and second link means are actuated in response to sliding of said first frame to move said second frame and seat relative to said first frame.

2. The seat adjusting apparatus as defined in claim 1, wherein said mounting means includes a pair of lower and upper rails, said lower rails rigidly mounted on the ground in parallel and said upper rails slidably positioned about said lower rails and affixed to said first frame.

3. The seat adjusting apparatus as defined in claim 2 wherein said second frame attaching means include forward and rearward rods extending between said parallel rails and connected to said first link means.

4. The seat adjusting apparatus as defined in claim 2 wherein said cam slot is a substantially straight elongated groove declining gradually with respect to a horizontal plane in a direction away from said backrest.

5. The seat adjusting apparatus as defined in claim 2 wherein said cam slot is curved slightly downward in a direction away from said backrest.

6. The seat adjusting apparatus as defined in claim 2, including means for selectively preventing sliding movement between said pair of rails.

7. The seat adjusting apparatus as defined in claim 2 wherein said means for selectively preventing sliding movement between said pair of rails includes:
- a toothed plate projecting substantially orthogonally from the base of one of said lower rails;
- a lock plate pivotably attached to one of said upper rails; and
- means for engaging said lock plate with said toothed plate.

8. A seat adjusting apparatus, which comprises:
- a pair of lower and upper rails, said lower rails rigidly mounted on a vehicle floor in parallel and said upper rails slidably positioned about said lower rails;
- a main frame assembly including a first frame supporting a backrest and a second frame supporting a seat, said first frame being attached to said upper rails so that the first frame can slide in forward and rearward movements;
- first link means pivotally interconnecting said second frame to said first frame, such that the seat is moved in forward and rearward movements relative to the first frame by the first link means in response to forward and rearward movements of said first frame, thereby simultaneously moving said seat and said backrest in opposite relative directions;
- a cam plate affixed to one of said lower rails and having a cam slot;
- second link means rotatably mounted to said upper rail and having first and second end sections, said first end section extending substantially perpendicular to said second end section and having a cam follower to ride within said cam slot, said second end section connected to said first link means to pivotally move said first link means in response to rotation of said second link means as the upper rails slide on the lower rails; and
- means for selectively preventing sliding movement between said rails.

9. The seat adjusting apparatus as defined in claim 8, wherein said cam slot is linearly disposed along said cam plate declining gradually measured with respect to a horizontal plane in a direction away from said backrest.

10. The seat adjusting apparatus as defined in claim 8, wherein said cam slot is a curved elongated groove.

* * * * *